(12) United States Patent
Arnault et al.

(10) Patent No.: US 11,525,487 B2
(45) Date of Patent: Dec. 13, 2022

(54) CLUTCH RELEASE BEARING AND ROLLING BEARING FOR A CLUTCH RELEASE BEARING

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/375,697

(22) Filed: Jul. 14, 2021

(65) Prior Publication Data
US 2022/0025938 A1    Jan. 27, 2022

(30) Foreign Application Priority Data
Jul. 23, 2020 (FR) ...................................... 2007761

(51) Int. Cl.
*F16D 23/14* (2006.01)
*F16C 19/16* (2006.01)

(52) U.S. Cl.
CPC ............ *F16D 23/147* (2013.01); *F16C 19/16* (2013.01); *F16D 23/148* (2013.01); *F16C 2361/43* (2013.01)

(58) Field of Classification Search
CPC ...... F16D 23/147; F16D 23/148; F16D 23/14; F16C 19/16; F16C 2361/43
See application file for complete search history.

(56) References Cited

U.S. PATENT DOCUMENTS

| 4,815,867 | A | 3/1989 | Ladin |
| 2004/0026207 | A1 | 2/2004 | Dittmer et al. |

FOREIGN PATENT DOCUMENTS

| FR | 2887311 | B1 | 9/2007 | |
| FR | 2 992 383 | A1 | 12/2013 | |
| FR | 2992383 | A1 | 12/2013 | |
| GB | 1 580 301 | A | 12/1980 | |
| GB | 1580301 | A | * 12/1980 | ............ F16C 19/163 |
| GB | 1580301 | A | 12/1980 | |
| WO | 0244579 | A1 | 6/2002 | |
| WO | WO 02/44579 | A1 | 6/2002 | |

OTHER PUBLICATIONS

Written Opinion and Search Report from the French Patent Office dated Apr. 6, 2021 in related French application No. FR2007761, and translation thereof.

* cited by examiner

*Primary Examiner* — Huan Le
(74) *Attorney, Agent, or Firm* — J-Tek Law PLLC; Scott T. Wakeman; Mark A. Ussai

(57) ABSTRACT

A clutch release bearing for a motor vehicle includes a thrust element having an axial axis, a guide element supporting said thrust element, and a self-aligning sleeve including an annular body and a plurality of radial ribs extending towards the guide element from the body with a free end of each of the ribs radially contacting the guide element. The guide element includes angular retaining members for limiting angular movement of at least one radial rib of the plurality of radial ribs, which members may be integrally formed with the guide element or formed as separate elements attached to the guide element.

10 Claims, 7 Drawing Sheets

CLUTCH RELEASE BEARING AND ROLLING BEARING FOR A CLUTCH RELEASE BEARING

CROSS-REFERENCE

This application claims priority to French patent application no. 2007761 filed on Jul. 23, 2020, the contents of which are fully incorporated herein by reference.

TECHNOLOGICAL FIELD

The present disclosure is directed to the field of clutch release bearings and rolling bearings, in particular rolling bearings used in clutch release bearings.

BACKGROUND

Generally, clutch release bearings comprise a thrust element configured to cooperate with a clutch diaphragm, the thrust element being mounted on an operating element capable of moving translationally under the action of a control member, such as a clutch release fork or a hydraulic control piston. The thrust element is additionally able to move radially with respect to the operating element within the necessary limits of self-aligning of the thrust element with respect to the diaphragm.

In a known manner, the thrust element comprises a rolling bearing comprising a rotating ring and a non-rotating ring, that is to say a fixed ring. The rotating ring is provided with a radial thrust surface intended to come into contact with the end of an operating member, such as, for example, the diaphragm of the clutch.

A non-rotating operating or guide element supports the rolling bearing and, under the action of a control member, for example a mechanical, electrical or hydraulic control member, will axially move the rolling bearing so as to cause the thrust surface of the rotating ring to be brought to bear axially against the diaphragm of the clutch and thus to actuate the clutch mechanism.

A self-centering or self-aligning sleeve is generally interposed between the non-rotating ring of the rolling bearing and the guide element, the sleeve providing for the connection between these two components while, by virtue of its elasticity, allowing a relative radial movement between them. The rolling bearing can thus move radially so as to be self-centered on the sleeve and thus the guide element.

Reference may be made in this regard to document FR 2,887,311 B1, which describes a clutch release bearing comprising a self-centering sleeve comprising a friction lip configured to rub against the rotating ring.

In certain conditions, angular sliding phenomena occur between the self-aligning sleeve and the guide element, in particular for example when using a sliding material associated with a weak interface between the sleeve and the guide element or during vibrations. Such sliding can damage the sleeve, thus causing premature wear of the sleeve that could result in a radial compensation defect, that is to say the loss of the self-aligning function of the sleeve.

SUMMARY

An aspect of the present disclosure is to overcome these disadvantages and to improve the clutch release bearings in order to avoid any premature wear of the self-aligning sleeve.

An embodiment of the present disclosure includes a clutch release bearing, in particular for a motor vehicle, comprising a thrust element, of axial axis, and a guide or operating element supporting the thrust element.

The release bearing further comprises a self-aligning or self-centering sleeve comprising an annular body, for example, mounted in the thrust element, and a plurality of radial ribs or projections, for example, parallel to the axial axis, extending, for example obliquely, towards the guide element from the bore of the body, the free end of each of the ribs coming into radial contact with the guide element.

The guide element comprises at least one angular retaining member for limiting movement of at least one rib of the self-aligning sleeve.

The angular retaining member makes it possible to immobilize the ribs of the sleeve on the guide element in terms of angular rotation, thus reducing premature wear of the sleeve, in particular of the ribs, in the case of angular rotation of the sleeve with respect to the guide element.

The thrust element is advantageously configured to come axially into contact with an actuating member of a clutch mechanism, such as, for example, a diaphragm.

The guide or operating element is configured to move translationally along the axial axis under the action of a control member of the clutch mechanism such as a clutch release fork or a hydraulic control piston.

Advantageously, the guide element comprises a tubular part in the form of a bushing delimited radially by a cylindrical external surface and an internal surface, the ribs of the self-aligning sleeve making radial contact with the external surface of the bushing. The angular retaining member projects radially from the external surface of the bushing of the guide element.

The bushing is, moreover, delimited axially by a radial bearing portion and a free lateral edge, on the opposite side to the radial bearing portion.

The ribs are elastically deformable radially and make it possible for the thrust element to move radially with respect to the guide element during a clutch release operation, so as to allow the self-alignment of the rolling bearing with respect to the clutch diaphragm when the axes of rotation of the thrust element and of the diaphragm are not aligned.

What is to be understood by "elastically deformable" is any member which, by virtue of its shape or its material, is capable of deforming in a reversible manner under the action of an external stress exerted on the member and of adopting its initial shape in the absence of external stress.

For example, the ribs extend axially over the whole length of the bore of the body, without extending axially beyond the bore.

According to one embodiment, the angular retaining member and the bushing of the guide element form a monolithic or one-piece assembly, that is to say a single rigid part.

Integrating the angular retaining members into the mold of the bushing is particularly inexpensive. However, such a solution cannot be added to existing guide elements.

For example, the angular retaining member may molded directly with the bushing.

For example, the angular retaining member may have a parallelepipedal shape, for example, a rectangular or square shape in cross section, or else a rounded shape. The free end of the retaining member may be rounded, rectangular, beveled or pointed.

According to another embodiment, the angular retaining member is a separate part from the bushing of the guide element.

Advantageously, the angular retaining member comprises a fastening part configured to be fastened in the bushing and an angular retaining part coaxial to the fastening part that projects radially beyond the external surface of the bushing towards the sleeve.

The fastening part is, for example, fastened, for example by means of a tight fit, by clipping or by adhesive bonding, in an orifice of corresponding shape that is formed in the external surface of the bushing.

As a variant, any other mechanism of fastening the angular retaining members to the bushing could be provided. For example, the angular retaining member could be directly adhesively bonded onto the external surface of the bushing.

For example, the orifice for receiving the fastening part may be a blind orifice or a through-orifice.

Advantageously, the angular retaining member is made of a more rigid material than the ribs of the self-aligning sleeve.

For example, the angular retaining member is, for example, made of a rigid synthetic material, such as, for example, a polymer, an elastomer, or else of a metallic material, such as steel, or an alloy of metallic materials.

For example, the self-aligning sleeve is advantageously made of synthetic material, for example of elastomer or of natural rubber.

According to one embodiment, the guide element comprises a plurality of angular retaining members optionally regularly distributed over the circumference of the external surface of the bushing.

Each angular retaining member is arranged angularly between two adjacent ribs of the self-aligning sleeve.

According to one embodiment, the guide element comprises at least three angular retaining members optionally regularly distributed over the circumference of the external surface of the bushing.

Two adjacent angular retaining members are, for example, arranged angularly at 120° to one another.

According to one embodiment, the guide element comprises at least four angular retaining members that are, optionally, evenly distributed over the circumference of the external surface of the bushing.

Two angular retaining members may be, for example, arranged angularly at 90° to one another.

Advantageously, the thrust element comprises a rolling bearing comprising a non-rotating ring, a rotating ring coaxial to the non-rotating ring, and a row of rolling elements produced, for example, in the form of balls and mounted between the rings, the self-aligning sleeve being secured to the non-rotating ring.

The rolling bearing can also comprise a cage for maintaining the regular circumferential spacing of the rolling elements.

For example, the rolling bearing comprises an annular sealing member fastened to the rotating ring, in particular to a first axial portion.

For example, the non-rotating ring may comprise a toroidal portion having in cross section a quarter-circle concave internal profile forming a toric raceway for the rolling elements. The toroidal portion is delimited radially by the raceway and an annular surface forming the bore of the non-rotating ring. The non-rotating ring may further comprise an annular axial portion extending a large-diameter edge of the toroidal portion axially on the opposite side to the rotating ring. The axial portion is extended radially by an annular radial portion extending radially on the opposite side to the rolling elements.

For example, the rotating ring may comprise a toroidal portion having in cross section a quarter-circle concave internal profile forming a raceway for the rolling elements. The toroidal portion is delimited radially by the raceway and an annular surface forming the outer surface of the rotating ring. The toroidal portion is extended at each end by an annular axial portion. The first axial portion extends from a large-diameter edge of the toroidal portion and radially surrounds the toroidal portion of the non-rotating ring. The second axial portion extends from a small-diameter edge of the toroidal portion axially on the opposite side to the first axial portion. The rotating ring further comprises an annular radial portion extending radially from the second axial portion towards the non-rotating ring.

The radial portion of the non-rotating ring can be situated axially beyond the end of the first axial portion of the rotating ring. The radial portion of the rotating ring is situated axially beyond the end of the toroidal portion of the non-rotating ring, on the opposite side of the radial portion, so as to leave an axial space between the internal surface of the radial portion and the end of the toroidal portion. The cage is mounted axially between the rolling elements and the radial portion of the rotating ring.

For example, the non-rotating ring may be the inner ring, and the rotating ring may be the outer ring radially surrounding the inner ring.

For example, the sleeve further may comprise a sealing member extending axially from a lateral edge of the body of the sleeve, on the opposite side of the radial portion of the non-rotating ring, towards the radial portion of the rotating ring. The sealing member may be arranged axially in the free axial space existing between the non-rotating ring and the radial portion of the rotating ring.

According to one embodiment, the sealing member comprises a sealing lip. The sealing lip extends along a direction which is essentially inclined or oblique towards the interior with respect to the axial axis, for example by an angle of 45°. The sealing lip can extend axially beyond the sleeve, in such a way that the sealing lip comes into axial frictional contact with the radial portion of the rotating ring, forming a dynamic seal, in order to prevent the ingress of polluting or contaminating particles between the non-rotating and rotating rings. The lip is advantageously flexible or elastically deformable in the axial direction. The free end of the lip can advantageously have in cross section a triangular or V shape so as to reduce the friction torque with the rotating ring.

The retaining cage is, for example, arranged radially between the toroidal portion of the rotating ring and the sealing lip. The sleeve can also comprise a reinforcing member or insert situated in the body of the sleeve and comprising a radial portion extending towards the rolling elements and in axial contact with the end of the toroidal portion of the non-rotating ring, on the opposite side of the radial portion. The insert may be, for example, made of a more rigid material than the body of the sleeve, the ribs and the sealing member. For example, the assembly formed by the body of the sleeve, the ribs and the sealing member can be overmolded around the insert. As a variant, the sleeve may not have such an insert.

BRIEF DESCRIPTION OF THE DRAWINGS

The present invention will be better understood on studying the detailed description of the embodiments given by way of non-limiting examples and illustrated by the appended drawings, in which.

DETAILED DESCRIPTION

Figure 1:
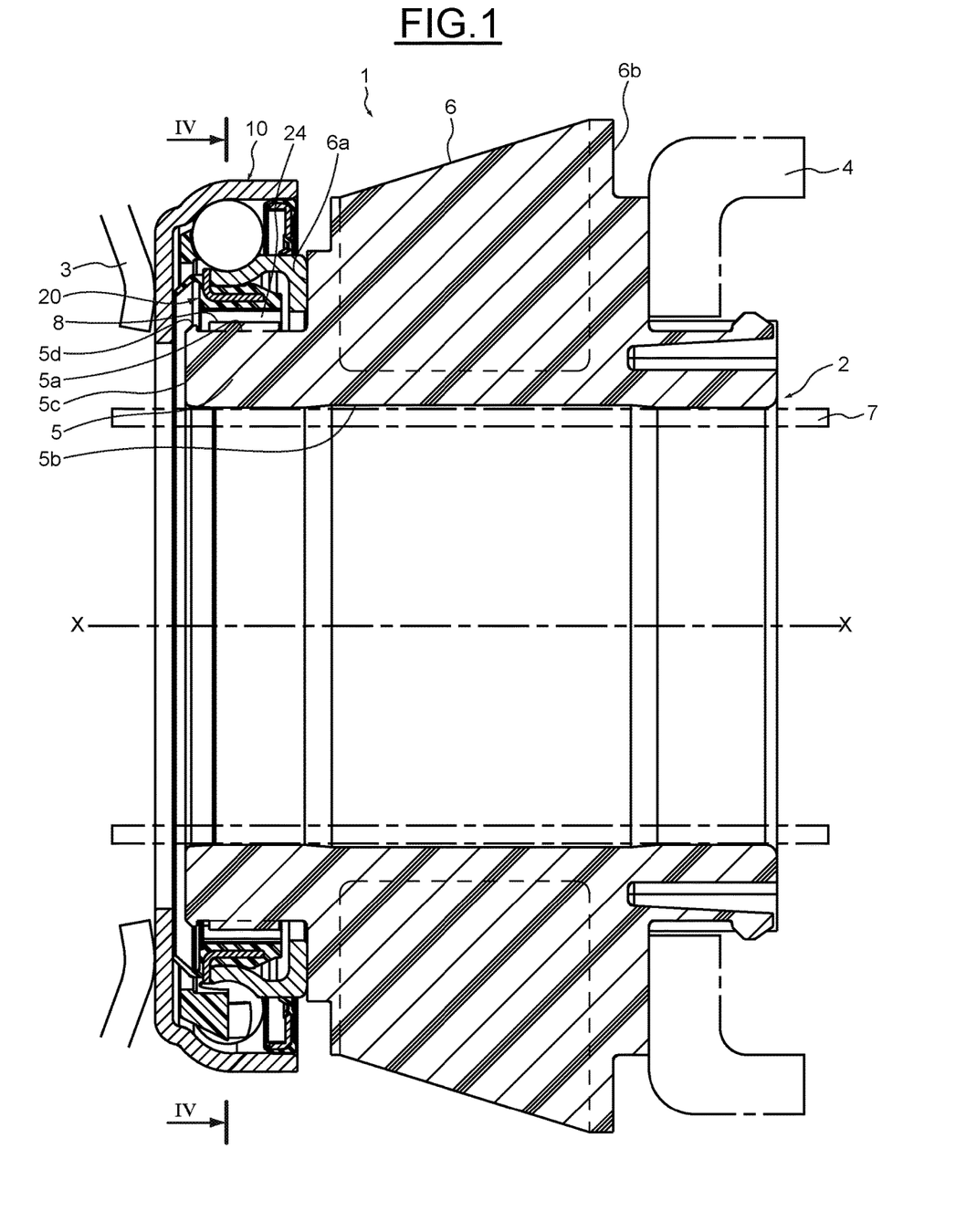
FIG. 1 is a view in axial section of a clutch release bearing according to one embodiment of the disclosure.
Figure 2:
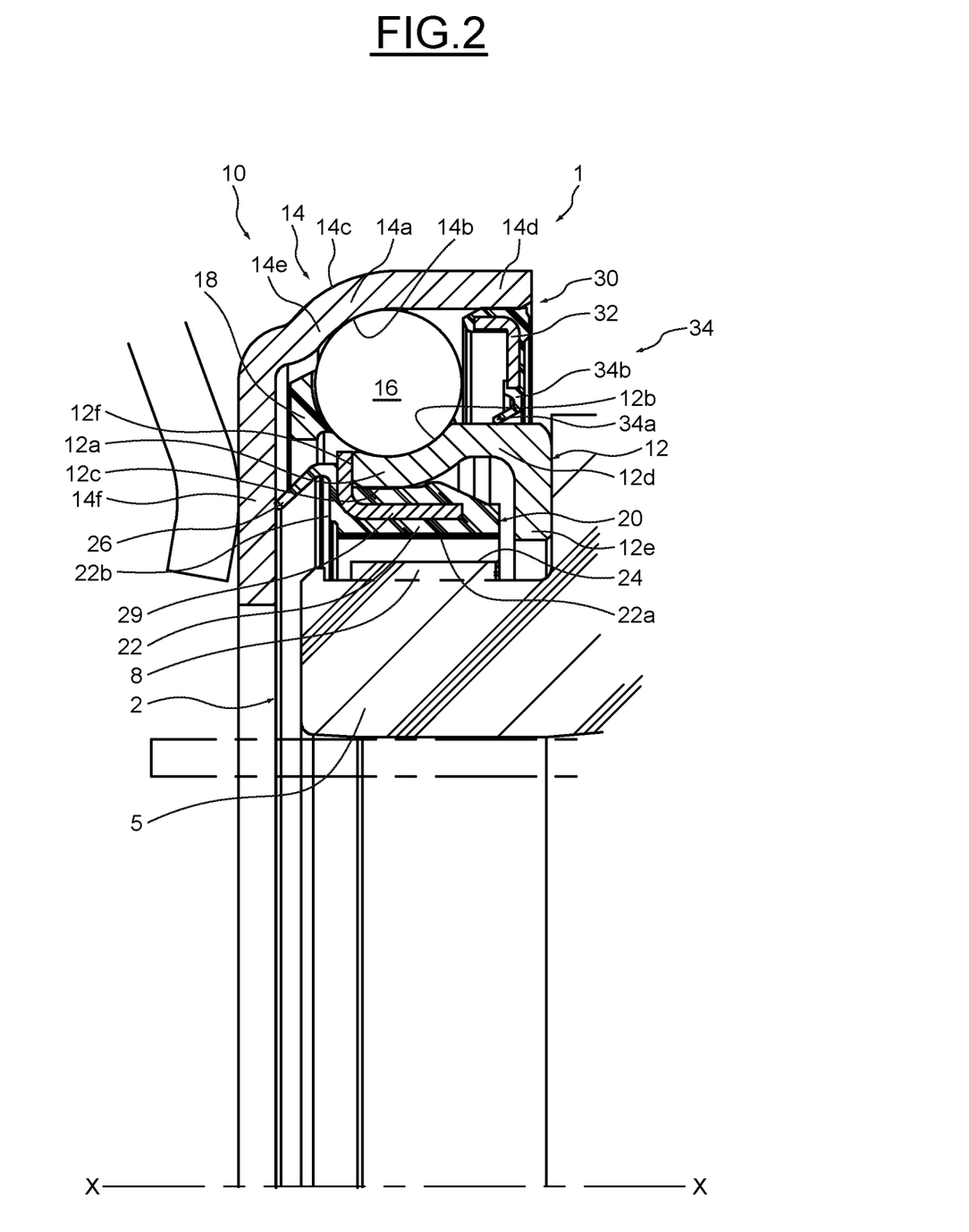
FIG. 2 is a detail view of FIG. 1.

In FIG. 1 there is shown, in axial section, a disengagement-engagement clutch release bearing device or disengagement-engagement clutch release bearing 1 comprising a thrust element 10, here a rolling bearing, and a non-rotating operating or guide element 2 supporting the rolling bearing 10.

The rolling bearing 10 is configured to cooperate with a clutch diaphragm 3 shown in FIG. 1 or any member allowing the actuation of a clutch, for example of a motor vehicle. The guide element 2 is configured to move translationally along the axial axis X-X under the action of a control member 4 shown in dotted lines in FIG. 1, such as a clutch release fork or a hydraulic control piston.

The rolling bearing 10, having an axis of rotation X-X, comprises a non-rotating inner ring 12, a rotating outer ring 14, a row of rolling elements 16, here produced in the form of balls, and mounted between the rings 12, 14 and a cage 18 for maintaining the regular circumferential spacing of the rolling elements.

The inner ring 12, centered on the axis X-X, which may be referred to as a "thin-wall ring," can advantageously be produced by stamping a steel sheet or tube. The inner ring 12 comprises a toroidal portion 12a having in cross section a quarter-circle concave internal profile 12b forming a toric raceway for the rolling elements 16. The toroidal portion 12a is delimited radially by the raceway 12b and an annular surface 12c forming the bore of the inner ring 12. The inner ring 12 further comprises an annular axial portion 12d extending a large-diameter edge of the toroidal portion 12a axially on the opposite side to the outer ring 14. The axial portion 12d is extended radially by an annular radial portion 12e extending radially on the opposite side to the rolling elements 16.

The outer ring 14, on axis X-X, is coaxial to the inner ring 12. The outer ring 14, which also may be referred to as a "thin-wall ring," can advantageously be produced by stamping a steel sheet or tube. The outer ring 14 comprises a toroidal portion 14a having in cross section a quarter-turn concave internal profile 14b forming a toric raceway for the rolling elements 16. The toroidal portion 14a is delimited radially by the raceway 14b and an annular surface 14c forming the outer surface of the outer ring 14. The toroidal portion 14a is extended at each end by an annular axial portion 14d, 14e. The first axial portion 14d extends from a large-diameter edge of the toroidal portion 14a and radially surrounds the toroidal portion 12a of the inner ring 12. The second axial portion 14e extends from a small-diameter edge of the toroidal portion 14a axially on the opposite side to the first axial portion 14d. The outer ring 14 further comprises an annular radial portion 14f extending radially from the second axial portion 14e towards the inner ring 12.

The radial portion 12e of the inner ring 12 is situated axially beyond the end of the first axial portion 14d of the outer ring 14. The radial portion 14f of the outer ring 14 is situated axially beyond the end 12f of the toroidal portion 12a of the inner ring 12, on the opposite side of the radial portion 12e, so as to leave an axial space between the internal surface of the radial portion 14f and the end 12f of the toroidal portion 12a.

The cage 18 is mounted axially between the rolling elements 16 and the radial portion 14f of the outer ring 14.

The clutch release bearing 1 further comprises a self-aligning or self-centering sleeve 20 mounted clamped in the bore 12c of the inner ring 12, and an annular sealing member 30 fastened to the outer ring 14, in particular to the first axial portion 14d.

Figure 5:
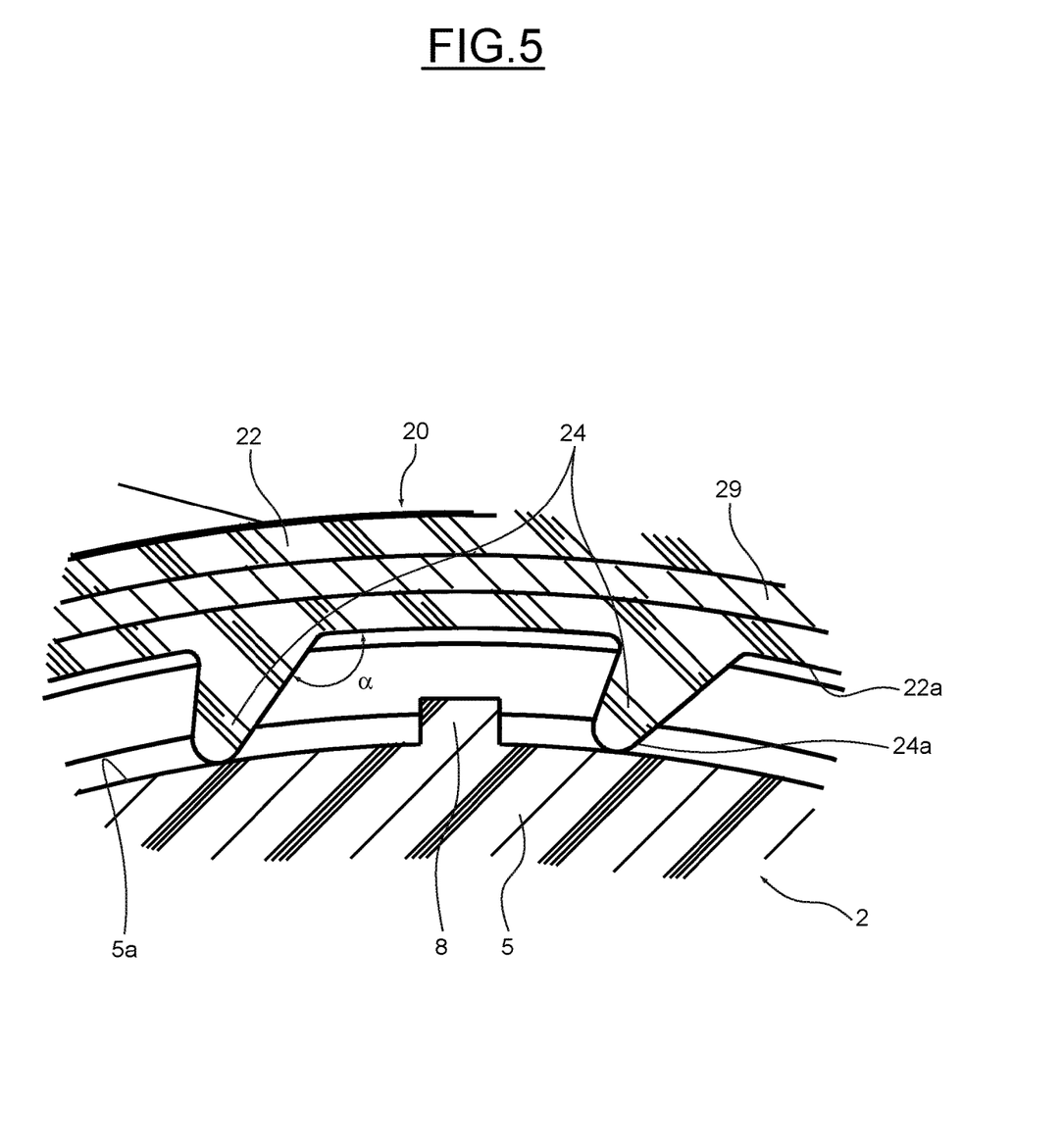
FIG. 5 is a detail view of FIG. 4.

The self-aligning sleeve 20 is advantageously made of synthetic material, for example of elastomer or of natural rubber. The sleeve 20 comprises an annular body 22 mounted in the bore 12c of the inner ring 12 and in radial contact with the bore 12c. As illustrated, the body 22 does not bear axially against the radial portion 12e of the ring 12. As a variant, the body 22 could be configured to bear axially against the radial portion 12e of the inner ring 12. The sleeve 20 comprises a plurality of radial ribs 24 or projections which are parallel to the axial axis X-X and extend towards the interior from the bore 22a of the body 22 along a straight line forming an angle α with the bore 22a. As illustrated in FIG. 5, the angle α is substantially equal to 130°. As a variant, the angle α is between 90° and 135°. In a general manner, the ribs 24 extend substantially radially towards the interior, that is to say towards the axis X-X, from the bore 22a of the body 22 of the sleeve 20. As illustrated, the ribs 24 extend axially over the whole length of the bore 22a of the body 22, without extending axially beyond the bore. The free end 24a of each of the ribs 24 is configured to come into contact with the guide element 2 of the clutch release bearing device 1 associated with the rolling bearing 10. The ribs 24 are elastically deformable radially and allow the rolling bearing 10 to move radially with respect to the operating element during a clutch release operation, so as to allow the self-alignment of the rolling bearing with respect to the clutch release diaphragm 3 when the axes of rotation of the rolling bearing 10 and of the diaphragm are not aligned.

What is to be understood by "elastically deformable" is any member which, by virtue of its shape or its material, is capable of deforming in a reversible manner and with the action of an external stress exerted on the member and of adopting its initial shape in the absence of external stress.

The sleeve 20 further comprises a sealing member 26 extending axially from a lateral edge 22b of the body 22 of the sleeve, on the opposite side of the radial portion 12e of the inner ring 12, towards the radial portion 14f of the outer ring 14. The sealing member 26 is arranged axially in the free axial space existing between the inner ring 12 and the radial portion 14f of the outer ring 14. As illustrated, the sealing member 26 comprises an annular sealing lip extending along a direction which is substantially inclined or oblique towards the interior with respect to the axial axis X-X, for example by an angle of 45°. The sealing lip 26 extends axially beyond the sleeve 20 in such a way that the sealing lip 26 comes into axial friction contact with the radial portion 14f of the outer ring 14 forming a dynamic seal in order to prevent the ingress of polluting particles between the inner ring 12 and the outer ring 14. The sealing lip 26 is flexible or elastically deformable in the axial direction. The free end of the lip 26 can advantageously have in cross section a triangular or V shape so as to reduce the friction torque with the outer ring 14.

As a variant, there could be provision for the sealing member to comprise two annular sealing lips arranged radially one above the other. The upper sealing lip could extend axially beyond the lower sealing lip, with the result that the upper sealing lip comes into axial friction contact with the radial portion 14f of the outer ring 14 forming a dynamic seal in order to prevent the ingress of polluting particles between the inner ring 12 and the outer ring 14. The lower lip would thus make it possible to reduce the quantity of polluting particles directed towards the upper lip.

The retaining cage 18 is arranged radially between the toroidal portion 14a of the outer ring and the sealing lip 26.

The sleeve 20 further comprises a reinforcing member or insert 29 situated in the body 22 of the sleeve and comprising a (non-referenced) radial portion extending towards the rolling elements 16 and in axial contact with the end 12f of the toroidal portion 12a of the inner ring 12, on the opposite side to the radial portion 12e. The insert 29 is, for example, made of a more rigid material than the body 22 of the sleeve, the ribs 24 and the sealing member 26. For example, the assembly formed by the body 22 of the sleeve 20, the ribs 24 and the sealing member 26 can be overmolded around the insert 29. It is also possible, in a variant, for the sleeve not to have such an insert.

The additional sealing member 30 is arranged axially on the opposite side to the sealing lip 26 of the sleeve 20, with respect to the rolling elements 16. The additional sealing member 30 comprises a reinforcement or flange 32 on which there is arranged an internal seal 34 made of a flexible material, more flexible than the flange 32, and configured to exert dynamic sealing with the inner ring 12. What is to be understood by "dynamic sealing" is sealing between two components having a relative movement. The flange is made of a rigid material, for example by stamping, cutting and folding a steel sheet or tube. Alternatively, the flange 32 can be made of rigid synthetic material, for example of polyamide. The seal 34 is overmolded or vulcanized on a free end of the flange 32. The seal 34 can be made of elastomer, for example of nitrile rubber. The seal 34 comprises an annular radial heel 34a covering the free end of the flange 32, and an annular internal sealing lip 34b extending in a projecting manner from the heel 34a, respectively towards the interior, that is to say towards the rolling elements 16, and towards the exterior of the rolling bearing 10.

The internal lip 34b is oriented towards the interior of the rolling bearing and extends obliquely downwards. The lip 34b is flexible or elastically deformable in the radial direction. The free end of the lip 34b can advantageously have a triangular shape in cross section so as to reduce the friction torque with the inner ring 12.

Other shapes are possible for the free end of the lip 34b, such as, for example, a V shape oriented towards the interior in the direction of the inner ring 12.

The lip 34b comes into radial friction contact with the external surface of the axial portion 12d of the inner ring 12 and performs a dynamic sealing function with the inner ring 12.

As a variant, there could be provided an external lip extending from the heel 34a towards the exterior and oriented towards the exterior of the rolling bearing, that is to say on the opposite side of the rolling elements 16, and extending obliquely downwards. The external lip is flexible or elastically deformable in the radial direction. The free end of the external lip can advantageously have in cross section a triangular shape so as to reduce the friction torque with the inner ring 12.

As a variant, the seal 34 could also comprise an annular deflecting lip oriented towards the exterior of the rolling bearing 10 on the opposite side to the rolling elements 16. The deflecting lip can extend axially in a projecting manner from a radial external edge of the heel 34a and be situated axially on the opposite side of the internal lip 34b with respect to the heel 34a. The deflecting lip can extend axially beyond the free end of the first axial portion 14d of the outer ring 14. The deflecting lip would make it possible to reduce the quantity of polluting particles directed towards the internal lip 34b of the seal 30. Specifically, when an air flow conveying polluting particles is directed from the exterior obliquely towards the interior in the direction of the inner ring 12, the deflecting lip 34d forms an obstacle that prevents the flow from reaching the internal and external lips 34b, 34c.

The lip 26 of the sleeve 20 and the internal lip 34b of the seal 30, which are, respectively, in frictional contact with the outer ring 14 and the inner ring 12, radially and axially delimit, between the rings, a leak-tight annular space containing the rolling elements 16.

The operating or guide element 2 serves as a support for the rolling bearing 10 by way of the ribs 24 of the sleeve 20. The guide element 2 comprises a tubular part in the form of a bushing 5 delimited radially by an external surface 5a and an internal surface 5b and axially by a radial bearing portion 6 and a free lateral edge 5c, on the opposite side to the radial bearing portion 6.

The internal surface 5b or bore of the sleeve 20 is in radial contact, at least in part, with a guide tube 7 of axial axis X-X.

The ribs 24 of the sleeve bear radially on the external surface 5a of the bushing 5.

The radial portion 12e of the inner ring 12 is in axial frictional contact with a first lateral surface 6a of the radial bearing portion 6. The second lateral surface 6b of the radial bearing portion 6 is intended to be in axial contact with a clutch release member 4, such as a clutch release fork in order to command the axial movement of the clutch release bearing 1.

The radial bearing portion 6 and the bushing 5 can be made in one piece, or in two pieces, with, for example, the radial portion 6 being able to be a metal sheet on which the bushing 5 is overmolded.

The bushing 5 is made of a more rigid synthetic material than the sleeve 20, such as, for example, of polymer.

Figure 4:
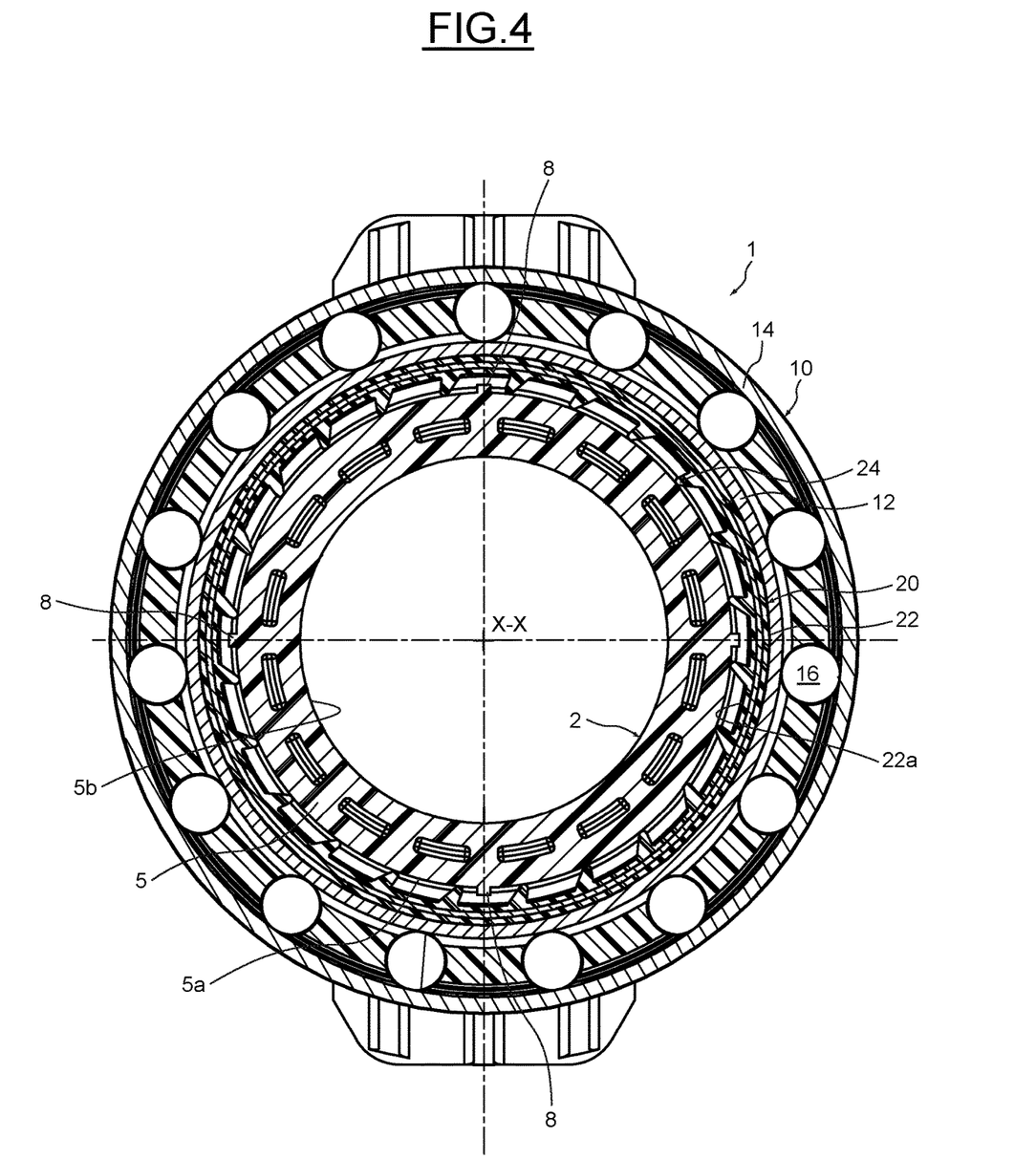
FIG. 4 is a view in section along line IV-IV of FIG. 1.

As illustrated in FIG. 4, and in a no way limiting manner, the body of the bushing 5 has through-holes of oblong shape in the circumferential direction. Such holes make it possible to reduce the quantity of material used and the mass of the guide element 2. As a variant, there could be provision for the body of the bushing to be solid and/or to have other material cutouts.

With the aim of compensating for defects in terms of alignment or centering of the clutch release bearing with respect to the diaphragm, the rolling bearing 10 can move radially with respect to the rigid guide element 2, the radial ribs 24 bending to a greater or lesser degree on the bushing 5 of the guide element 2. The radial movement is, moreover, guided by the frictional contact between the radial portion 12e of the inner ring 12 and the radial bearing portion 6 of the guide element 2.

The free lateral edge 5c of the bushing 5, on the opposite side of the radial bearing portion 6, is provided with an axial retaining member 5d, for example an annular bead, extending radially towards the outside, that is to say towards the rolling bearing 10, from the external surface 5a of the bushing 5.

In the mounted state, visible in FIG. 1, the sleeve 20, which is secured to the inner ring 12 of the bearing 10, is retained axially with respect to the guide element 2. Thus, the thrust element formed by the rolling bearing 10 and the sleeve 20 is secured axially to the guide element 2 while being capable of moving radially with respect to the latter.

With the aim of angularly rotationally immobilizing the ribs 24 of the sleeve 20 on the bushing 5 of the guide element 2, the guide element 2 comprises a plurality of angular retaining members 8 projecting radially from the external surface 5a of the bushing 5 of the guide element 2.

As illustrated, the angular retaining members 8 number four and are regularly distributed over the circumference of the external surface 5a of the bushing 5. Each angular retaining member is arranged angularly between two adjacent ribs 24 of the sleeve 20.

Each of the four angular retaining members 8 is arranged at 90° from an adjacent angular retaining member 8 on the circumference of the bushing 5. As a variant, there could be provided a non-regular arrangement of the cutouts 8 over the circumference of the bushing 5.

As a variant, just one angular retaining member could be provided or a different number of angular retaining members could be provided.

It could also be provided that the angular retaining members 8 are not regularly distributed over the circumference of the external surface 5a of the bushing 5.

Figure 3:
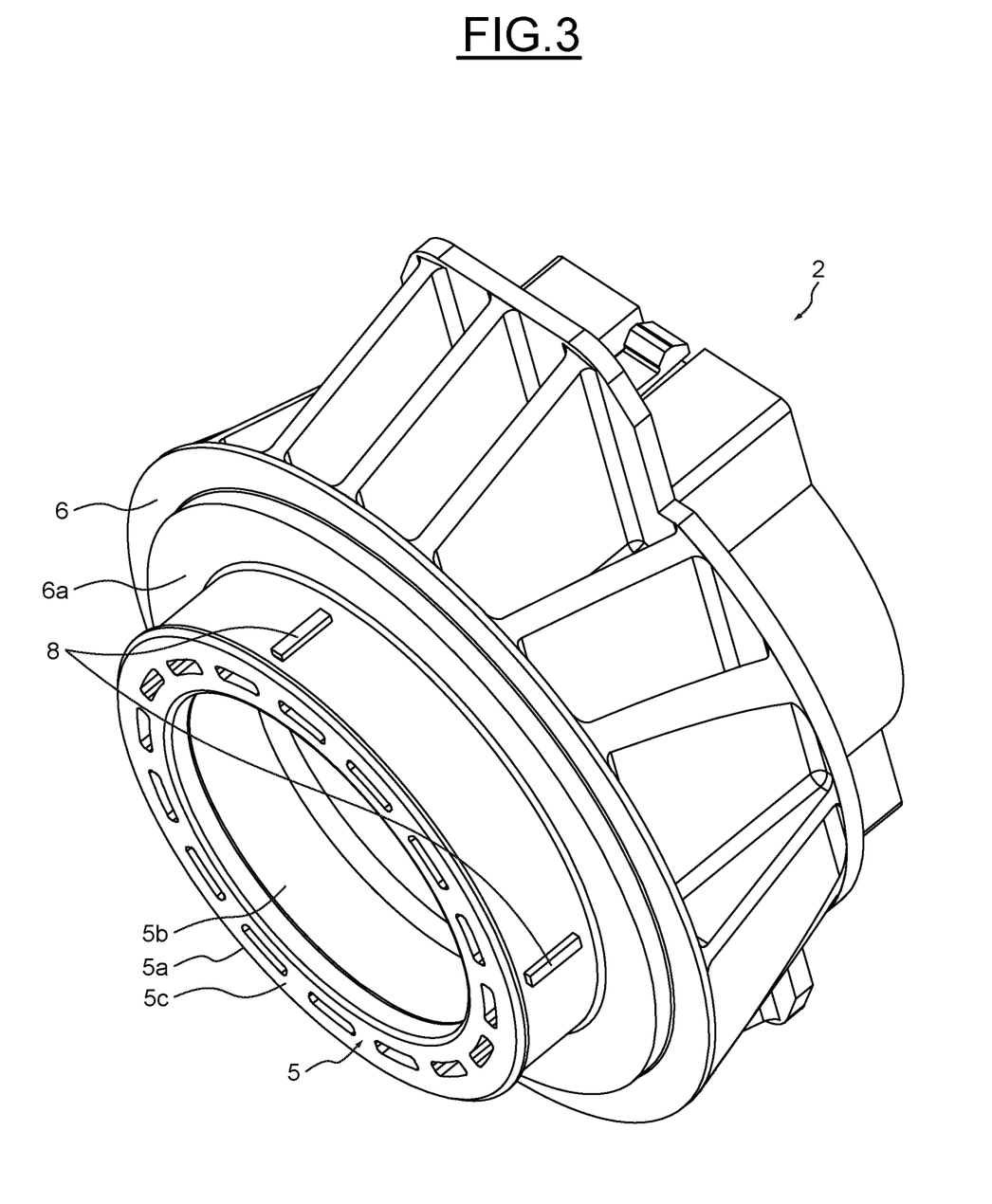
FIG. 3 is a partial perspective view of a guide element of the release bearing of FIG. 1.

In the example illustrated in FIGS. 3 to 5, the retaining members 8 and the bushing 5 form a monolithic assembly, that is to say a single rigid part. The retaining members 8 are thus molded directly with the bushing 5.

Each of the retaining members 8 has in cross section a parallelepipedal shape, for example a square or rectangular shape, or else a rounded shape. The free end of the retaining members 8 may be of rounded, rectangular, beveled or pointed shape.

Integrating the angular retaining members into the mold of the bushing is particularly inexpensive. However, such a solution cannot be added to existing guide elements.

Figure 6:
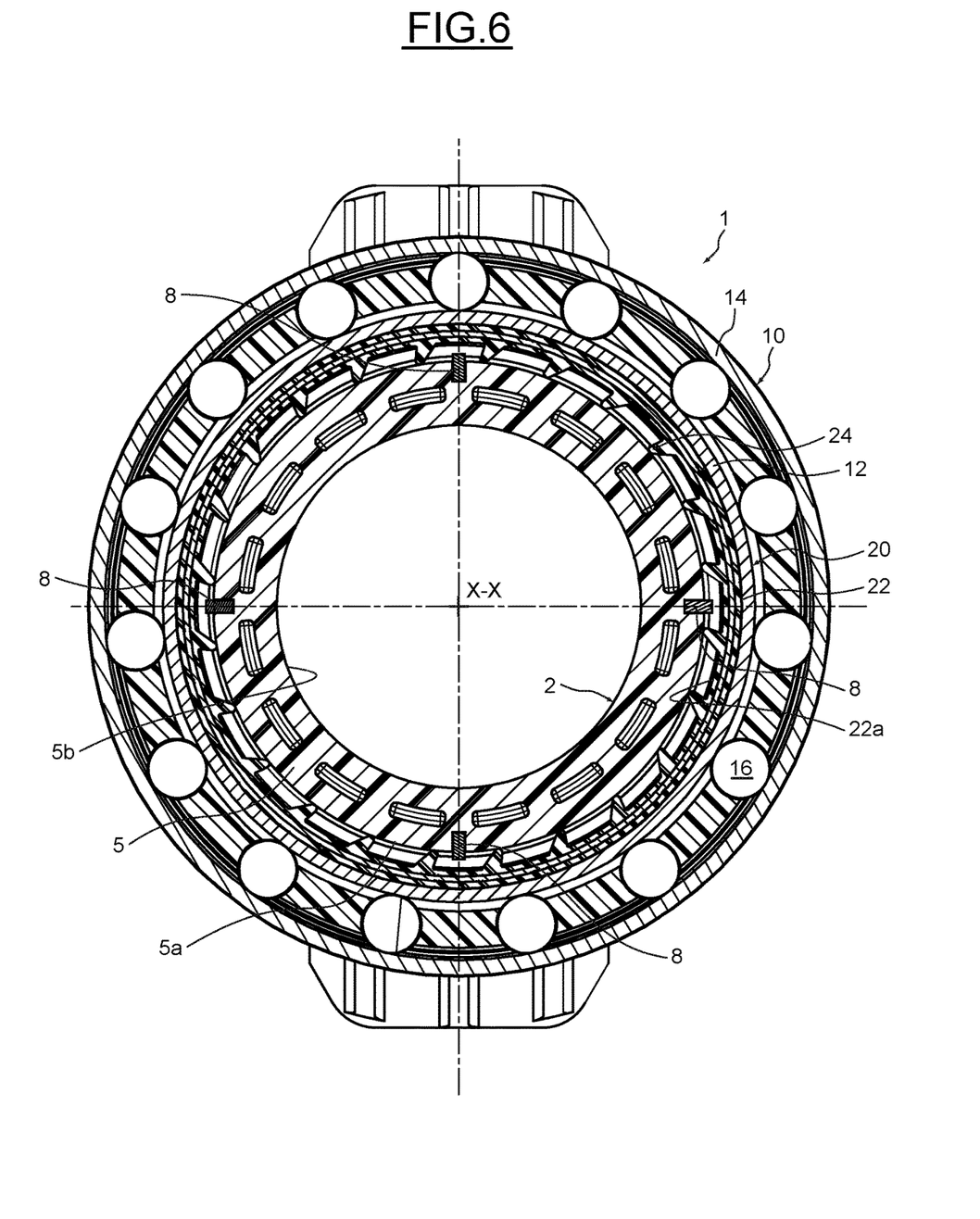
FIG. 6 is a view in section of a clutch release bearing according to a second embodiment of the disclosure.
Figure 7:
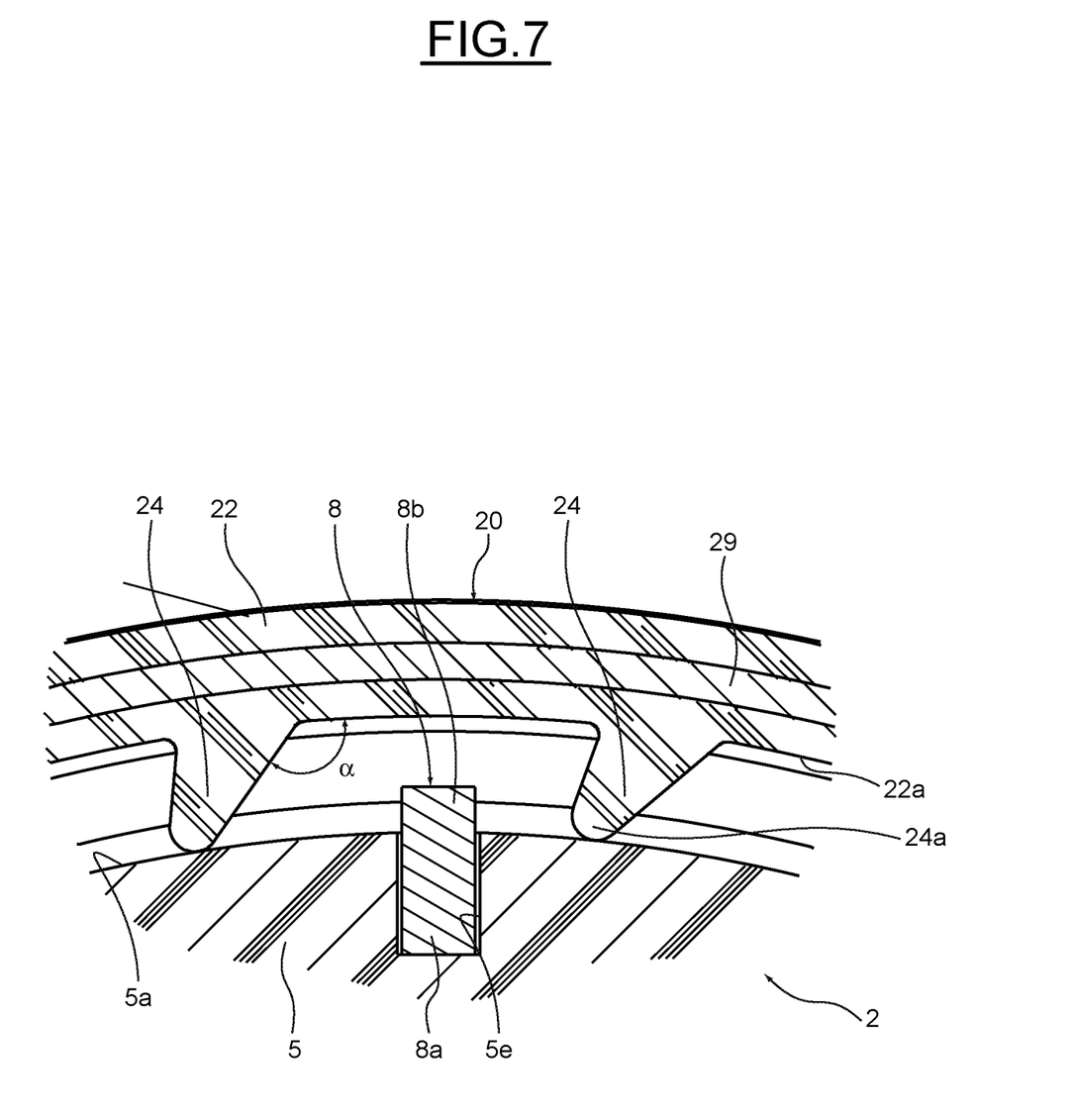
FIG. 7 is a detail view of FIG. 6.

The embodiment illustrated in FIGS. 6 and 7, in which the identical elements bear the same references, differs from the embodiment illustrated in FIGS. 3 to 5 only through the fact that the angular retaining members 8 are separate parts from the bushing 5.

As illustrated in FIGS. 6 and 7, each of the angular retaining members 8 comprises a fastening part 8a configured to be in each case fastened in the bushing 5, in particular in an orifice 5e of corresponding shape in the bushing 5. Each of the members 8 further comprises an angular retaining part 8b coaxial to the fastening part 8a and projecting radially beyond the external surface 5a of the bushing 5 towards the sleeve 20. Such angular retaining members 8 form keys which can be inserted into orifices 5e of corresponding shape in the bushing 5. The fastening part 8a is, for example, mounted with a tight fit in the corresponding orifice 5e. As a variant, there could be provided any other means of fastening the angular retaining members. For example, the angular retaining members 8 could be directly adhesively bonded onto the external surface 5a of the bushing 5.

The orifices 5e for receiving the fastening parts 8a may be blind orifices or through-orifices.

It will be noted that the guide element 2 could comprise at least one angular retaining member 8, as illustrated in FIGS. 3 to 5, and at least one angular retaining member 8, as illustrated in FIGS. 6 and 7.

The angular retaining members 8 are made of a more rigid material than the ribs 24 of the sleeve. For example, the angular retaining members 8 are, for example, made of rigid synthetic material, such as, for example, polymer, an elastomer, or else a metallic material, such as steel, or an alloy of metallic materials.

By virtue of the angular retaining members, in the case of the phenomenon of angular sliding between the ribs 24 of the sleeve 20 and the bushing 5 of the guide element 2, the ribs 24 will bear angularly against the angular retaining members 8, thereby avoiding premature wear of the ribs 24 that could result in a defect in terms of radial compensation, that is to say the function of self-alignment of the sleeve 20.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved clutch release bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A clutch release bearing for a motor vehicle, comprising:
    a thrust element having an axial axis,
    a guide element supporting said thrust element, the guide element comprising a bushing having a cylindrical external surface and an internal surface, and
    a self-aligning sleeve comprising an annular body and a plurality of radial ribs extending towards the bushing from the body, a free end of each of the ribs being in radial contact with the external surface of the bushing,
    wherein the bushing includes at least one projection extending radially from the external surface for limiting angular movement of at least one radial rib of the plurality of radial ribs.

2. The clutch release bearing according to claim 1, wherein the projection is formed integrally with the bushing.

3. The clutch release bearing according to claim 1, wherein the projection is a separate element from the bushing.

4. The clutch release bearing according to claim 3, wherein the projection comprises steel or a steel alloy.

5. The clutch release bearing according to claim 3,
    wherein the projection comprises a fastening part configured to be fastened to the bushing and a retaining part coaxial to the fastening part and projecting radially beyond the external surface of the bushing towards the sleeve.

6. The clutch release bearing according to claim 5, in which the fastening part is fastened in an opening in the external surface of the bushing.

7. The clutch release bearing according to claim 1, wherein the projection is made of a more rigid material than a material of the plurality of radial ribs of the self-aligning sleeve.

8. The clutch release bearing according to claim 1, wherein the at least one projection comprises a plurality of projections evenly distributed around a circumference of the external surface of the bushing.

9. The clutch release bearing according to claim 8, wherein each of the at least one projection is arranged angularly between two adjacent ribs the plurality of radial ribs of the self-aligning sleeve.

10. The clutch release bearing according to claim 1, wherein the thrust element comprises a rolling bearing comprising a non-rotating ring, a rotating ring coaxial to the non-rotating ring, and a row of rolling elements mounted between the rotating ring and the non-rotating ring, the self-aligning sleeve being secured to the non-rotating ring.

\* \* \* \* \*